US010312777B2

(12) United States Patent
Fröhlich et al.

(10) Patent No.: US 10,312,777 B2
(45) Date of Patent: Jun. 4, 2019

(54) METHOD AND DEVICE FOR WELDING WIRE SEGMENT PAIRS (71) Applicant: CONTINENTAL AUTOMOTIVE GMBH, Hannover (DE)

(72) Inventors: Holger Fröhlich, Berlin (DE); Ricus Müller, Berlin (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 29 days.

(21) Appl. No.: 15/626,591

(22) Filed: Jun. 19, 2017

(65) Prior Publication Data

US 2017/0310198 A1 Oct. 26, 2017

Related U.S. Application Data (63) Continuation of application No. PCT/EP2015/073732, filed on Oct. 14, 2015.

(30) Foreign Application Priority Data

Dec. 19, 2014 (DE) .................. 10 2014 226 710

(51) Int. Cl.
  *B23K 26/24* (2014.01)
  *H02K 15/00* (2006.01)
  (Continued)

(52) U.S. Cl.
  CPC ....... *H02K 15/0081* (2013.01); *B23K 26/037* (2015.10); *B23K 26/0604* (2013.01);
  (Continued)

(58) Field of Classification Search
  CPC ............... B23K 26/037; B23K 26/082; B23K 26/0604; B23K 26/24; B23K 26/26;
  (Continued)

(56) References Cited

U.S. PATENT DOCUMENTS 6,990,724 B2    1/2006  Tamura et al.
2002/0033649 A1 3/2002  Dohashi et al.
          (Continued)

FOREIGN PATENT DOCUMENTS

CN    1695285 A    11/2005
CN  101557149 A    10/2009
          (Continued)

OTHER PUBLICATIONS

International Search Report and Written Opinion dated Jul. 4, 2016 from corresponding International Patent Application No. PCT/EP2015/073732.
          (Continued)

*Primary Examiner* — Brian W Jennison (57) ABSTRACT

A method for welding a plurality of wire segment pairs is disclosed. Each wire segment pair has two adjacent wire segments, and each adjacent wire segment has a contact region where the wire segment is to be welded to the respective other wire segment. The wire segment pairs are successively guided between two elements of a pressing unit, and at a weld moment in which at least one of the wire segment pairs is located between the two elements. The pressing unit exerts a pressing force onto the wire segment pair such that the contact regions of the wire segments are pressed against each other. At each weld moment, laser radiation is irradiated onto the wire segment pair to which the pressing unit is exerting the pressing force, and the laser radiation is irradiated onto a region in which the contact regions are pressed against each other.

30 Claims, 5 Drawing Sheets (51) Int. Cl.
*H02K 3/12* (2006.01)
*B23K 26/035* (2014.01)
*B23K 26/082* (2014.01)
*B23K 26/06* (2014.01)
*H02K 3/28* (2006.01)
*H02K 3/50* (2006.01)
*B23K 101/36* (2006.01)

(52) U.S. Cl.
CPC ............ *B23K 26/082* (2015.10); *B23K 26/24* (2013.01); *H02K 3/12* (2013.01); *H02K 3/28* (2013.01); *H02K 3/505* (2013.01); *H02K 15/0068* (2013.01); *B23K 2101/36* (2018.08)

(58) Field of Classification Search
CPC ............ B23K 37/0443; B23K 2101/32; B23K 2101/38; H02K 3/12; H02K 3/28; H02K 3/505; H02K 15/00; H02K 15/0081; H02K 15/0068
USPC .......................................................... 219/58
See application file for complete search history.

(56) References Cited

U.S. PATENT DOCUMENTS

2003/0137207 A1* 7/2003 Tamura .............. H02K 15/0056
310/184
2006/0141874 A1* 6/2006 Lenoir ............... B23K 37/0443
439/874
2009/0269206 A1* 10/2009 Yelistratov .............. B23P 6/007
416/229 A
2011/0062127 A1* 3/2011 Gu .......................... B23K 26/04
219/121.69

FOREIGN PATENT DOCUMENTS

| | | |
|---|---|---|
| CN | 102362416 A | 2/2012 |
| CN | 102672358 A | 9/2012 |
| DE | 60129902 | 5/2008 |
| DE | 102008020943 A1 | 10/2009 |
| EP | 1850463 A2 | 10/2007 |
| WO | 2012119691 A1 | 9/2012 |

OTHER PUBLICATIONS

German Search Report dated Feb. 17, 2016 for corresponding German Patent Application No. 10 2014 226 710.2.
Chinese Office Action dated Jun. 28, 2018 for corresponding Chinese Patent Application No. 201580028318.3.

* cited by examiner

METHOD AND DEVICE FOR WELDING WIRE SEGMENT PAIRS

CROSS-REFERENCE TO RELATED APPLICATIONS

This application claims the benefit of PCT Application PCT/EP2015/073732, filed Oct. 14, 2015, which claims priority to German Application DE 10 2014 226 710.2, filed Dec. 19, 2014. The disclosures of the above applications are incorporated herein by reference.

TECHNICAL FIELD

The disclosure relates to a method and a device for welding a plurality of wire segment pairs that may be conductors in an electrical machine, such as a three-phase generator for motor vehicles.

BACKGROUND

Wire segment pairs are welded to one another in large numbers in a plurality of different application fields. An example of this is the production of three-phase generators for motor vehicles. In this case, it is necessary to weld conductors to one another. In this context, EP 1 850 463 discloses a method for producing weld connections on conductors of a three-phase generator for motor vehicles. The stator of the generator includes in this case a winding embodied from individual winding rods that are pre-bent in the form of a hair pin and are inserted with a forcing-apart step by a pole pitch into the laminated core grooves of the stator. The free ends of the winding rods are interlaced against one another on the other side of the laminated core and are welded in pairs to one another. In the conventional arrangement of insert windings for generators of motor vehicles, the weld connections of conductor segments that are pre-bent in the form of a hair pin lie on one side in the winding head, preferably on the drive side of the machine. However, when by means of individual rods for the conductor segments, it is also possible in the same manner to produce weld connections in both winding heads on both end faces of the stator.

In EP 1 850 463, the winding heads are welded by means of a resistance welding method. For resistance welding on winding heads, material resistance and contact resistance are particularly important. While the material resistance at the beginning of the welding procedure is low and the contact resistances, in the case of copper in particular between the electrode and joining parts, are high, this behavior changes even after a short period of time. As a result, the greatest electrical resistance is not experienced in the joining gap but rather at the contact surfaces between the electrode and the workpiece. Thus, the surface state and the heat conductibility of the conductor segments and electrodes have a great influence on the resistance welding and the quality of the joining process since, for example, oxide layers impair the current through-flow and excessively high heat dissipation losses hamper the joining process.

Therefore, the method disclosed in EP 1 850 463 has the disadvantage of not being able to ensure the quality of the joining process, the disadvantage of only being able to guarantee the automation of the joining process to a low level and the disadvantage of causing damage to the insulation on the winding such as, by way of example, peeling, rupturing or crack formation as a result of high heat dissipation during the welding procedure.

SUMMARY

Therefore is it desirable to have a method and a device that overcome these disadvantages. Furthermore, to be able to achieve a modern, industrial series production, the joining processes should include a high productivity rate and quality in the automation procedure. To be able to repeatedly produce the weld seams, the wire segments that are to be welded should be in the correct position and fixed securely to one another. For example, the construction of the device that is used for this purpose should suit the conditions of the laser welding unit.

In accordance with the disclosure, a method for welding a plurality of wire segment pairs is disclosed. A wire segment pair includes two wire segments that lie adjacent to one another. In some examples, the wire segments lie adjacent to one another in such a manner that they can be pressed against one another and that the peripheral surfaces of the wire segments make contact with one another.

The term 'wire segment' is understood to mean a section of a wire. In some implementations, the wire segments can be end segments or end regions of wires. The wire segments may therefore be delimited on one side by the end of the particular wire of which they are a section. In some examples, the wire includes or consists of copper. The choice of material depends upon what is to be produced by the welding process.

The respective adjacent wire segments of each wire segment pair includes a contact region in which they shall be welded to the respective other wire segment of this wire segment pair. The contact region is the particular region of the surface of the corresponding wire segment that contacts the other wire segment of the wire segment pair if the wire segments, as further described hereinunder, are pressed against one another by the contact-pressing unit. It is necessary that the contact region is structurally identical to the remaining surface of the corresponding wire segment. However, it does not need to be predetermined right from the beginning but rather may be determined by means of the contact-pressing unit during the procedure of pressing the regions against one another.

In some implementations, the wire segment pairs are guided one after the other between two elements of a contact-pressing unit previously mentioned. The contact-pressing unit exerts a contact-pressing force in sequence on the wire segment pairs so that the wire segments of the corresponding wire segments are pressed against one another at their contact regions. As previously mentioned, those particular regions of the surface of the wire segments in which the wire segments make contact during this procedure of pressing the regions against one another can be regarded as contact regions.

If the wire segment pairs pass one after the other between the two elements of the contact-pressing unit, they are pressed one after the other against one another. The particular point in time at which one wire segment pair is located between the two elements of the contact-pressing unit so that a contact-pressing force is exerted on this wire segment pair and the wire segments of this wire segment pair are pressed against one another at their contact regions shall be referred to hereinunder as the weld moment. The weld moments of wire segment pairs that are guided one after the other between the elements of the contact-pressing unit therefore preferably follow one another. If multiple wire segment pairs are guided simultaneously between the two elements of the contact-pressing unit so that the contact-pressing force is also exerted simultaneously on these wire segment pairs, then the weld moment is identical for these wire segment pairs.

In some implementations, at the respective weld moment, laser radiation is directed at the particular wire segment pair or at those particular wire segment pairs against which the contact-pressing unit is exerting a contact-pressing force at this weld moment. In other words, the wire segments of a given wire segment pair are pressed against one another, for example, at the same time that the laser radiation is directed at this corresponding wire segment pair.

In doing so, the laser radiation is directed into one region of the wire segment pair in which the contact regions of the wire segments of the corresponding wire segment pairs are pressed one against the other. In other words, the laser radiation is directed in such a manner that the wire segments of a given wire segment pair are welded to one another in their contact regions. Wave lengths, power, intensity and/or the focusing of the laser radiation may be dimensioned such that the corresponding weld result is achieved.

In some examples, it is possible to guide two wire segment pairs at the weld moments between the two elements of the contact-pressing unit. In other words, these two wire segment pairs are welded to one another at the same moments in time and therefore have the identical weld moment. In some implementations, the contact regions of the wire segments of these wire segment pairs all lie on a common force vector of the contact-pressing force at the weld moment. In this manner, the two wire segment pairs may be pressed against one another in each case by a common contact-pressing unit.

A spacer that prevents the wire segments of different wire segment pairs from coming into contact with one another during the contact-pressing procedure may be arranged between the wire segment pairs. In some examples, the spacer is a spacer ring that separates a plurality of wire segment pairs.

In some implementations, the wire segment pairs are arranged along a circle or along multiple concentric circles. The wire segment pairs may be arranged equidistance from one another along the corresponding circle. In some examples, the wire segment pairs are arranged in such a manner that the contact regions of the corresponding wire segments lie adjacent to one another in each case in a radial manner with respect to the corresponding circle. It is possible in this manner to press the contact regions against one another by a force that acts in a radial manner with respect to the corresponding circle. If multiple concentric circles are provided, then the wire segment pairs of all these circles may be pressed against one another by means of the identical contact-pressing device since the radial direction of all these concentric circles is identical.

In some implementations, the wire segment pairs are arranged along two concentric circles, in such a way that in each case the contact regions of the wire segments of one of the wire segment pairs of one of the circles and the contact regions of the wire segments of one of the wire segment pairs of the other circle lie adjacent to one another in a radial manner with respect to the circles. In this case, the contact regions of two wire segment pairs, i.e., a total of four contact regions, lie adjacent to one another in the radial direction. As such, it may be possible for the contact-pressing unit at the respective weld moment to exert a contact-pressing force simultaneously on one of the wire segment pairs of one of the circles and one of the wire segment pairs of the other circle. In other words, the contact-pressing force may be exerted simultaneously on all wire segments that lie adjacent to one another in a specific radial direction at the weld moment.

In some examples, laser radiation is then directed at the respective weld moment simultaneously at both of the wire segment pairs against which the contact-pressing force is being particularly exerted at the weld moment.

In some implementations, a spacer ring is arranged between the wire segment pairs of the two circles. The spacer ring may likewise include a circular shape and be arranged in a concentric manner with respect to the two circles along which the wire segment pairs are arranged.

In some examples, the laser radiation is directed by means of a dedicated laser beam for each of these wire segment pairs at all the wire segment pairs against which the contact-pressing force is exerted simultaneously at a given weld moment. In some examples, these laser beams are generated by means of a dedicated laser source. In other words, the number of laser beams used corresponds to the number of wire segment pairs that are to be welded to one another at a given weld moment and that a corresponding number of laser sources is also used.

In some implementations, the contact regions of the wire segments are delimited by means of one end of the corresponding wire segment. In other words, the contact regions lie on the end of the corresponding wire segment, where the corresponding wire segment can also be delimited by one end of the wire whose section is the corresponding wire segment. For example, the end of the wire delimits the wire segment as also the contact region of this wire segment.

Laser radiation may be directed at the corresponding end of the wire segment. For example, the laser radiation is directed in the direction of an end face of the corresponding wire segment. It some examples, it is possible to provide a blunt seam, an overlapping seam, a fillet seam or an I-seam between the wire segments that are to be welded to one another.

In some examples, a height difference between the wire segments of one of the wire segment pairs in the direction of incidence of the laser radiation is less than 0.5 mm. The end faces may be planar, i.e., have planar cut edges and be free of residues such as for example residual insulation lacquer, lubricating oil, finger prints and the like.

In some implementations, the two elements of the contact-pressing unit have a circular and/or tooth-shaped periphery. The term 'tooth wheel' is understood to mean a spur gear. Moreover, it is to be understood that such toothed wheels whose base diameter is constant likewise include a circular periphery.

In some examples, the two elements of the contact-pressing unit having mutually parallel axes of rotation that rotate in such a manner that their rate of rotation at their periphery is identical to the speed at which the wire segment that is closest to the corresponding element is guided between the two elements. The peripheral speeds of the two elements may be precisely equal to those speeds at which a wire segment of the wire segment pairs are guided between the elements that are facing the corresponding element. The two circular elements of the contact-pressing unit may move at the identical angular velocities, where however the radii of the two elements are adjusted so that the peripheral speed of the elements fulfills the above-mentioned condition.

If, as described above, the wire segment pairs are arranged along a circle or along multiple concentric circles, this means that the wire segment pairs are guided between the two elements of the contact-pressing unit in such a manner that the one circle or the concentric circles is/are rotated about an axis of rotation. In some examples, the axis of rotation is parallel to the axes of rotation about which the two elements of the contact-pressing unit are rotated. One of the elements of the contact-pressing unit may be arranged inside the circle or the circles along which the wire segment pairs are arranged and one of the elements may be arranged outside this circle. In this case, the inner one of the elements of the contact-pressing unit may have a slightly smaller radius than the outer one of said elements.

In some implementations, one or two of the elements of the contact-pressing unit is driven in such a manner that the wire segment pairs are moved by means of the one driven element or the driven elements between the elements of the contact-pressing unit. Alternatively, the elements of the contact-pressing unit may also rotate in a passive manner and the circular segment pairs may be driven.

If one or both of the elements of the contact-pressing unit are driven, then one or both of the elements of the contact-pressing unit may have a toothed periphery, where a periodic length of the toothing is equal to a periodic length with which the plurality of wire segment pairs is arranged adjacent to one another. In this case, the wire segment pairs are arranged equidistance from one another. As such, the elements of the contact-pressing unit transmit a driving force in a precise manner to the wire segment pairs.

Weld seams that are generated by the infrared laser radiation may still include numerous imperfections, for example, in the case of low rates of forward feed; however, using green laser radiation achieves weld seams that are of a constant quality. In some implementations, the laser radiation may be generated by a laser with a wave length of 1030 nm. The laser may be a disk laser, for example manufactured by the company Trumpf. Disk lasers have the advantage of being very robust so that a back reflection cannot damage the resonator. The power of the laser may be greater than or equal to 2000 watt, for example, greater than or equal to 4000 watt. In some examples, the laser is a continuous laser, for example a continuous wave laser.

In some examples, the laser can also generate radiation in the green range, in other words with a wave length between 635 nm and 750 nm. The power can then be greater than or equal to 2000 watt, for example, greater than or equal to 2500 watt and/or less than or equal to 4000 watt, for example, less than or equal to 3000 watt. As a result, if the wire segments include copper or are consist of copper, it is possible to achieve a particularly good coupling in of the laser energy.

The diameter of the laser beam may amount to less than tenths of a millimeter at the focal point. In other words, in some examples, there should only be a technically zero gap between the components that are to be connected. The wire segments may therefore be pressed against one another by the contact-pressing unit so that a gap between the corresponding contact regions is considerably less than 0.1 millimeter.

To maintain the technically zero gap between the wire segments for the welding process as long as possible (i.e., not only at one site where the elements of the contact-pressing unit form the smallest spacing), an elastic coating or a knurling arrangement is provided on the outer periphery of the elements of the contact-pressing unit. As a result, the friction increases which improves the forward feed of the wire segment pairs in the device.

In some examples, the smallest spacing between the elements of the contact-pressing unit is smaller than the dimensions of a wire segment pair or of all wire segment pairs that are simultaneously pressed together in the direction of the contact-pressing force.

In the case of an elastically deformable coating of the elements of the contact-pressing unit, the wire segment pair may be pressed together to form a zero gap and the welding procedure may be extended by the duration of the shape changing process between the elements of the contact-pressing unit. In contrast, in the case of a knurling arrangement of the elements of the contact-pressing unit, the wire segment pair may be deformed during the welding process.

In some implementations, the laser radiation is directed in an oscillating manner with the aid of scanning optics. In so doing, the laser beam may be guided with a pendulum movement numerous times one behind the other on the upper end face of the wire segments to melt a defined amount of the height of the corresponding wire segment. In some examples, as a consequence, a welding bead is formed that has a defined diameter. In some examples, welding takes place in the bath location.

In some implementations, the gap width does not fluctuate. Therefore, the wire segment pairs are positioned precisely and the spacing tolerance between two wire segment pairs that are to be welded together is maintained. In some examples, sensors may be used to ensure a constant quality. Sensors that follow the progression of the seam may detect deviations from the programmed path, and in response control the position of the laser beam. The sensors may compensate for inaccuracies in the edges and the positioning. Other sensors may measure the expansion of the melt bath and detect whether the welding process is being performed within the predetermined limits. Furthermore, further sensors may be used; the sensors being able to test the hardened weld seam and to differentiate between good and poor seams.

In some examples, at least one sensor is used to determine a position of the wire segment pairs against which the contact-pressing unit is to exert a contact-pressing force at the given weld moment. It is possible based on the position that is ascertained in this manner to adjust the focal point of the laser radiation in such a manner that the focal point has a desired position relative to the corresponding wire segment pair.

In some implementations, the wire segments can be winding rods of a winding of a stator. In some examples, the stator is a stator of a three-phase generator, by way of example of a three-phase generator for motor vehicles. The wire segments may also be end regions of wires that are bent in the form of a hair pin and hold the windings of such a stator together. The method according to the disclosure is inter alia very suitable for producing windings of a stator. Such a stator may include a winding that consists from individual winding rods. The individual winding rods may also be pre-bent in the form of a hair pin and may be inserted in a forcing-apart step before a pole pitch into grooves in a laminated core of the stator. Free ends of these winding rods may be interlaced against one another on the other side of the laminated core and may be welded in pairs to one another by means of the method in accordance with the disclosure. The weld connections of the winding rods may lie on one side in the winding head, for example, on a drive side of the machine. The winding of the stator may also be produced by individual rods that are not bent in the form of a hair pin. Individual rods of this type may be welded on two sides and this can be performed on both sides by means of the method according to the disclosure. It is possible in this manner to produce weld connections in both winding heads on both end faces of the stator.

Moreover, in some implementations, a device for welding a plurality of wire segment pairs is provided. As described above, each of the wire segment pairs includes two adjacent-lying wire segments, where the respective adjacent-lying wire segments of each wire segment pair have a contact region in which they are to be welded to the respective other wire segment of the corresponding pair. The statements made above with regard to the method apply in this case in a like manner.

In some examples, the device includes a contact-pressing unit having two elements, where the wire segment pairs can be guided one after the other between the two elements of the contact-pressing unit. It is possible by means of the contact-pressing unit to exert a contact-pressing force on this wire segment pair in each case at a weld moment at which at least one of the wire segment pairs is located between the two elements of the contact-pressing unit so that the wire segments of this wire segment pair can be pressed against one another at their contact regions.

Furthermore, the device may include a laser unit with which at the respective weld moment laser radiation can be directed at the particular wire segment pairs against which the contact-pressing unit is exerting a contact-pressing force at this weld moment. The laser radiation can be directed at one region in which the contact regions of the wire segments of the corresponding wire segment pairs are pressed against one another.

The statements regarding the method in accordance with the disclosure also applies to the device in accordance with the disclosure. In particular, the device in accordance with the disclosure is advantageously suitable for performing the method in accordance with the disclosure as described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
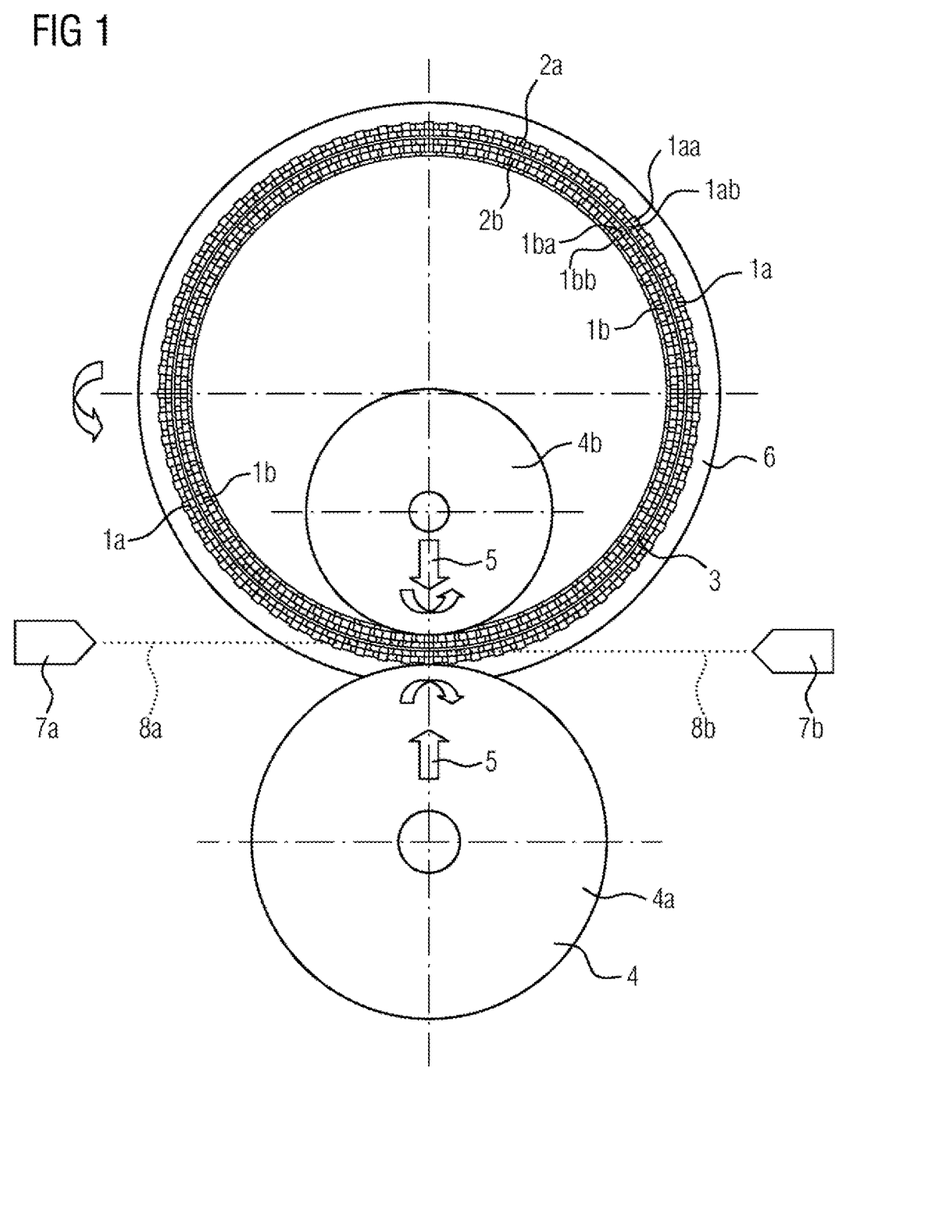
FIG. 1 illustrates a plan view of a device for performing the method.

FIG. 1 illustrates a plan view of a device in accordance with the disclosure for performing a method in accordance with the disclosure. As shown, winding rods $1aa$, $1ab$, $1ba$, $1bb$ of a stator of a three-phase generator are welded.

A plurality of wire segment pairs $1a$, $1b$ are arranged equidistantly from one another along two concentric circles $2a$, $2b$. As shown in FIG. 1, end faces of wire segments $1aa$, $1ab$, $1ba$, $1bb$ of the wire segment pairs can be seen since the wire segments are respectively end sections of the corresponding wire. In the plan view, a stator winding head 6 is shown; the stator winding head 6 can lie by way of example when in use on the drive side of a machine.

In the illustrated example, in each case two wire segment pairs $1a$, $1b$ lie adjacent to one another radially with respect to the circles $2a$, $2b$ along which the wire segment pairs $1a$, $1b$ are arranged. The two wire segment pairs $1a$, $1b$ being namely one wire segment pair $1a$ of the outer circle $2a$ and one wire segment pair $1b$ of the inner circle $2b$. A spacer ring 3 is arranged between the circles $2a$ and $2b$ and the spacer ring 3 separates the wire segment pairs $1a$ of the outer circle $2a$ from the wire segment pairs $1b$ of the inner circle $2b$. The spacer ring 3 is arranged in a concentric manner with respect to the circles $2a$ and $2b$.

Each wire segment pair $1a$, $1b$ includes two adjacent-lying wire segments $1aa$, $1ab$ or $1ba$, $1bb$. As shown, the wire segments $1aa$, $1ab$ or $1ba$, $1bb$ lie in a radial manner adjacent to one another. Each of the wire segments $1aa$, $1ab$, $1ba$, $1bb$ includes a contact region in which the corresponding wire segment $1aa$, $1ab$, $1ba$, $1bb$ is to be welded to the respective other wire segment of the corresponding wire segment pair $1a$, $1b$. The contact region may be that particular region of the corresponding wire segment $1aa$, $1ab$, $1ba$, $1bb$ that is facing the other wire segment $1aa$, $1ab$, $1ba$, $1bb$ of the identical wire segment pair $1a$, $1b$ and at which the wire segments are pressed against one another.

Moreover, the device includes a contact-pressing unit 4 that includes two elements $4a$ and $4b$. The wire segment pairs $1a$ and $1b$ are guided one after the other between the two elements $4a$ and $4b$ of the contact-pressing unit 4. The contact-pressing unit 4 includes the two rollers $4a$ and $4b$ as elements between which the wire segment pairs $1a$, $1b$ are to be guided one after the other. At specific points in time, referred to as weld moments, in each case two wire segment pairs $1a$ and $1b$, namely one wire segment pair $1a$ of the one circle $2a$ and one wire segment pair $1b$ of the second circle $2b$, are located simultaneously between the elements $4a$ and $4b$ so that at these weld moments the contact-pressing unit 4 exerts a contact-pressing force 5 on these wire segment pairs $1a$, $1b$. Consequently, the wire segments $1aa$, $1ab$, $1ba$, $1bb$ of these wire segment pairs $1a$ and $1b$ are pressed against one another at their contact regions.

The elements $4a$ and $4b$ of the contact-pressing unit 4 are driven in the illustrated example and cause a rotation of the circles $2a$ and $2b$ along which the wire segment pairs $1a$, $1b$ are arranged. In other words, the elements $4a$ and $4b$ on the one hand move the wire segment pairs $1a$, $1b$ and on the other hand press said wire segment pairs $1a$, $1b$ together. Alternatively, in some examples, it is also possible to drive a structure by which the wire segment pairs $1a$ and $1b$ are held. Such a structure can be, for example, a stator 6 that supports the wire segment pairs $1a$, $1b$. In this case, the elements $4a$ and $4b$ of the contact-pressing unit 4 may move simultaneously in a passive manner.

In the illustrated example, the element $4b$ of the contact-pressing unit 4 that lies inside the circles $2a$ and $2b$ has a smaller radius than the outer-lying element $4a$. This takes account of the fact that the inner circumference of the inner circle $2b$ is smaller than the outer circumference of the outer circle $2a$.

The device illustrated in FIG. 1 has two laser welding heads $7a$ and $7b$ by means of which their laser radiation $8a$, 8*b* is directed at the particular wire segment pairs 1*a* and 1*b* against which the contact-pressing unit 4 exerts a contact-pressing force 5 at a given weld moment. In other words, the laser welding heads 7*a* and 7*b* direct the laser radiation 8*a*, 8*b* precisely at the particular wire segment pairs 1*a* and 1*b* that are currently located between the elements 4*a* and 4*b* of the contact-pressing unit 4 and are pressed against one another by means of said unit. In this way, the wire segments 1*aa*, 1*ab* or 1*ba* and 1*bb* of the wire segment pairs 1*a* and 1*b* are welded to one another in each case. The laser radiation 8*a*, 8*b* is directed into a region of the corresponding wire segment pairs 1*a*, 1*b* in which the contact regions of the wire segments 1*aa*, 1*ab* or 1*ba*, 1*bb* are pressed against one another.

Figure 2:
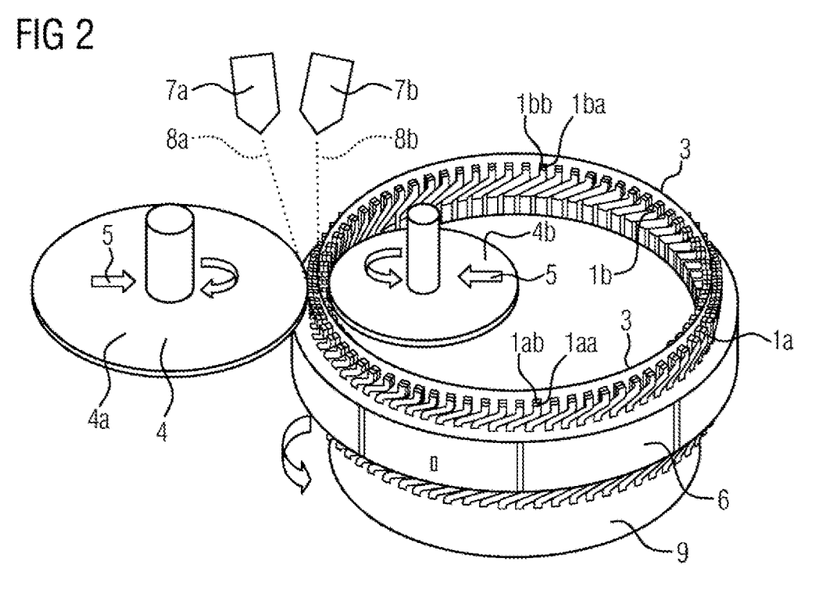
FIG. 2 illustrates a perspective view of a device for performing the method.

FIG. 2 illustrates a perspective view of the device illustrated in FIG. 1. The statements relating to FIG. 1 therefore apply also for the device illustrated in FIG. 2.

FIG. 2 illustrates the arrangement of the wire segment pairs 1*a* and 1*b* more clearly. The wire segment pairs 1*a* of the outer circle 2*a* are separated from the wire segment pairs 1*b* of the inner circle 2*b* by the spacer ring 3. As shown, the spacer ring 3 in the illustrated figure is protruding upwards slightly beyond the ends of the wire segment pairs 1*a*, 1*b*. It is also shown that the wire segments 1*aa*, 1*ab* or 1*ba*, 1*bb* are end sections of conductor wires that are angled in the area below the corresponding wire segments 1*aa*, 1*ab* or 1*ba* and 1*bb*. The winding of the stator 6 is produced by welding the end sections, that is the wire segments 1*aa*, 1*ab* or 1*ba* and 1*bb* of the corresponding wire segment pairs 1*a*, 1*b*.

Referring to FIG. 2, in some implementations, the stator 6 is arranged on a stator receiving device 9. This can be driven in the example shown, and as a consequence, the wire segment pairs 1*a* and 1*b* move successively, one after the other, between the elements 4*a* and 4*b* of the contact-pressing unit 4.

In some implementations, as can be seen in FIG. 2, the laser welding heads 7*a* and 7*b* direct radiation from above onto the wire segment pairs 1*a* and 1*b* between the elements 4*a* and 4*b*. In other words, the laser welding heads 7*a* and 7*b* direct radiation at the end faces of the wire segments 1*aa*, 1*ab*, 1*ba*, 1*bb* and thus weld the wire segments 1*aa*, 1*ab*, 1*ba*, 1*bb* of the wire segment pairs 1*a* and 1*b* to one another.

Figure 3:
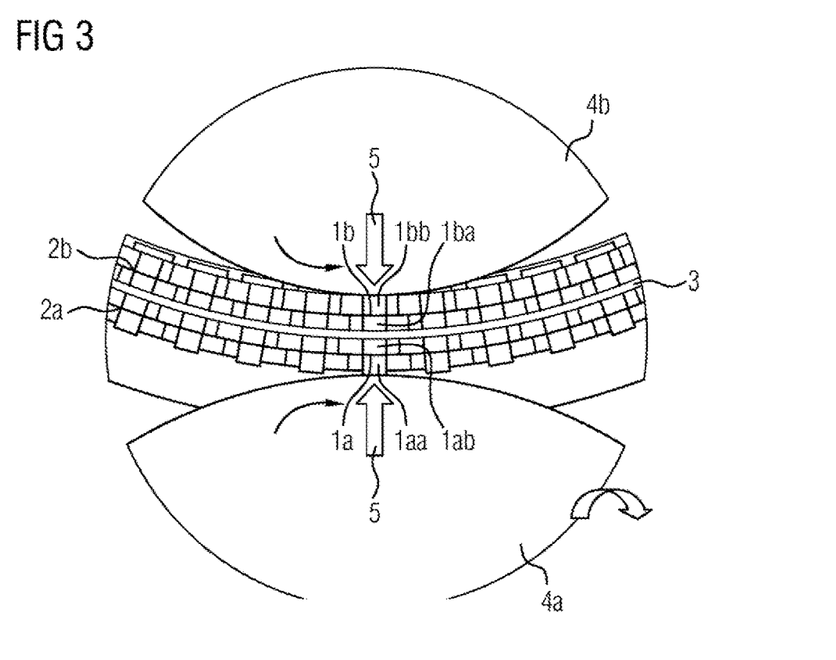
FIG. 3 illustrates an enlarged sectional view of a contact-pressing region of the device illustrated in FIG. 2.

Referring to FIG. 3, a section of the device illustrated in FIGS. 1 and 2 shows the region where the contact-pressing force 5 is exerted on the wire segment pairs 1*a* and 1*b*. As already described above, the elements 4*a* and 4*b* of the contact pressing unit 4 exert a contact-pressing force 5 on two wire segment pairs 1*a*, 1*b* that at a given moment in time are located precisely between the elements 4*a* and 4*b*. In some examples, one of the wire segment pairs 1*a* is arranged on the outer circle 2*a* and the other wire segment pair 1*b* is arranged on the inner circle 2*b*. When it states here that one wire segment pair 1*a*, 1*b* is located between the elements 4*a* and 4*b*, this means that the wire element pair 1*a*, 1*b* is located between the elements 4*a* and 4*b* where the distance between the elements 4*a* and 4*b* is the smallest. Here (where the distance between the elements 4*a* and 4*b* is the smallest), the contact-pressing force 5 is exerted on the wire segment pairs 1*a*, 1*b*. The particular point in time at which the wire segment pairs 1*a* and 1*b* in this sense lie between the elements 4*a* and 4*b* is described as the weld moment. At this point is time, the laser radiation 8*a*, 8*b* is directed as described above at the wire segment pairs 1*a* and 1*b* so that the wire segment pairs 1*a* and 1*b* are welded.

When considered more precisely, the procedure of pressing the wire segments 1*a* and 1*b* against one another extends over a specific time interval, where the contact-pressing force 5 initially increases during the course of this interval and decreases once a maximum has been reached. The welding process also continues when considered more precisely for a specific time interval that is preferably a part interval of the particular time interval during which the contact-pressing force 5 is exerted. Insofar as in this application moments in time are mentioned, this can be for example the middle of the corresponding interval. In some examples, the welding procedure continues precisely for the particular period of time in which the wire segments 1*a*, 1*b* are pressed together as far as a technically zero gap. If the elements 4*a*, 4*b* of the contact-pressing unit 4 are elastic, then the period of time in which the wire segments 1*a*, 1*b* are pressed together as far as a technically zero gap extends. As a result, the welding procedure can be extended by the duration of the shape changing process between the elements 4*a*, 4*b* of the contact-pressing unit 4.

The spacer ring 3 prevents the outer wire segment 1*ba* of the inner wire segment pair 1*b* from being welded to the inner wire 1*ab* of the outer wire segment pair 1*a*.

Figure 4:
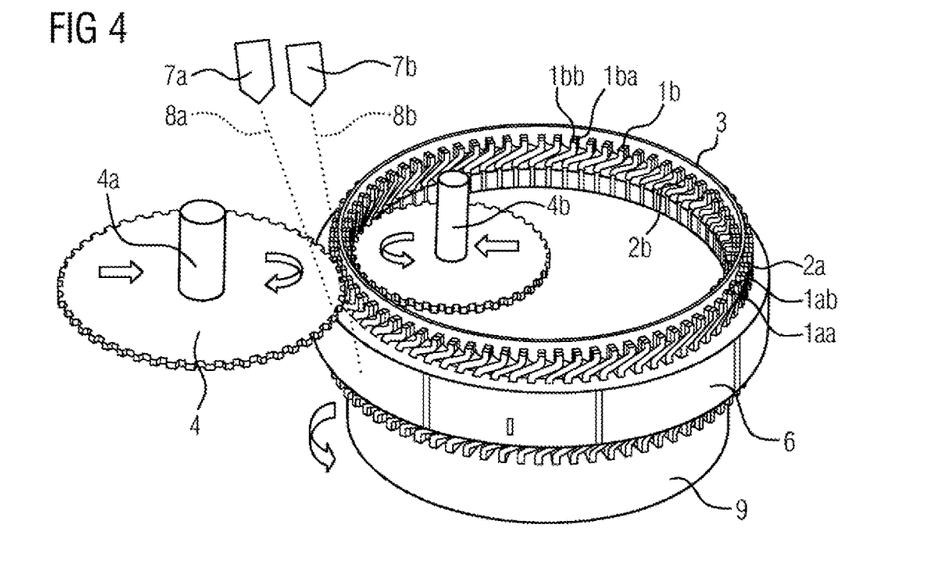
FIG. 4 illustrates a perspective view of a further implementation of a device.
Figure 5:
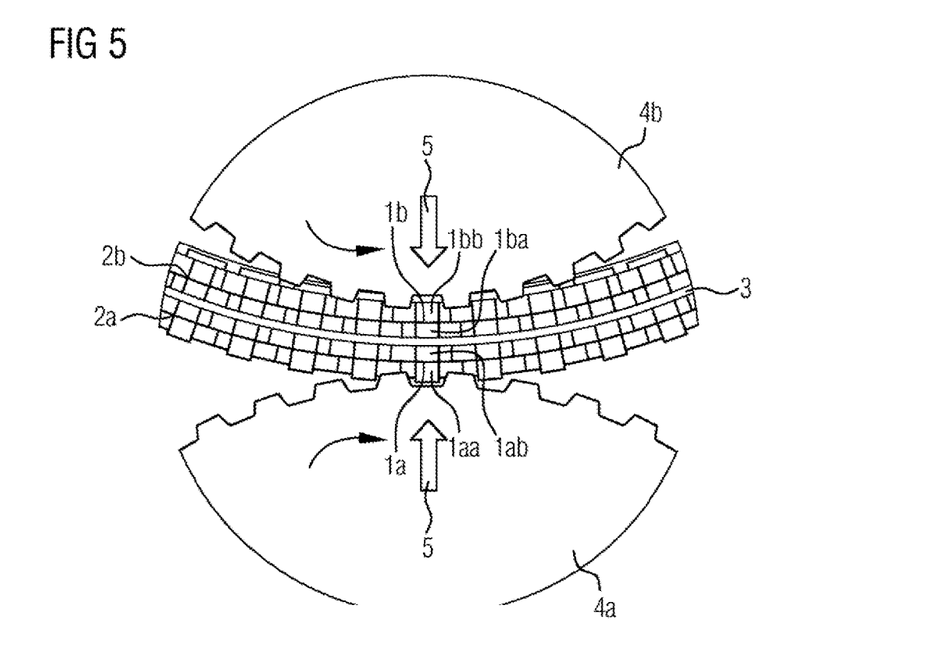
FIG. 5 illustrates an enlarged sectional view of a contact-pressing region of the implementation illustrated in FIG. 4.

FIGS. 4 and 5 illustrate the device in accordance with the disclosure that differs from the device illustrated in FIGS. 1-3 only by virtue of the elements 4*a* and 4*b* of the contact-pressing unit 4 having a toothed periphery. In other words, as shown in FIGS. 4 and 5, the elements 4*a* and 4*b* are circular in shape with a toothed periphery. All statements made with regard to FIGS. 1-3 are also applied to the device described in FIGS. 4 and 5.

As shown in FIG. 5, the toothing of the elements 4*a* and 4*b* of the contact-pressing unit 4 are dimensioned and spaced apart from one another in such a manner that the teeth in each case engage precisely between the particular wire segments 1*aa* or 1*bb* that are facing the corresponding element 4*a* or 4*b*. The periodic spacing of the teeth that are arranged equidistant from one another is identical to a periodic spacing in which the corresponding wire segment 1*aa* or 1*bb* are arranged. By way of the toothed elements 4*a* and 4*b*, it is possible to achieve a toothed movement of the wire segment pairs 1*a*, 1*b* with the elements 4*a* or 4*b*. In particular, it is possible in this manner to transmit a drive force easily.

Figure 6:
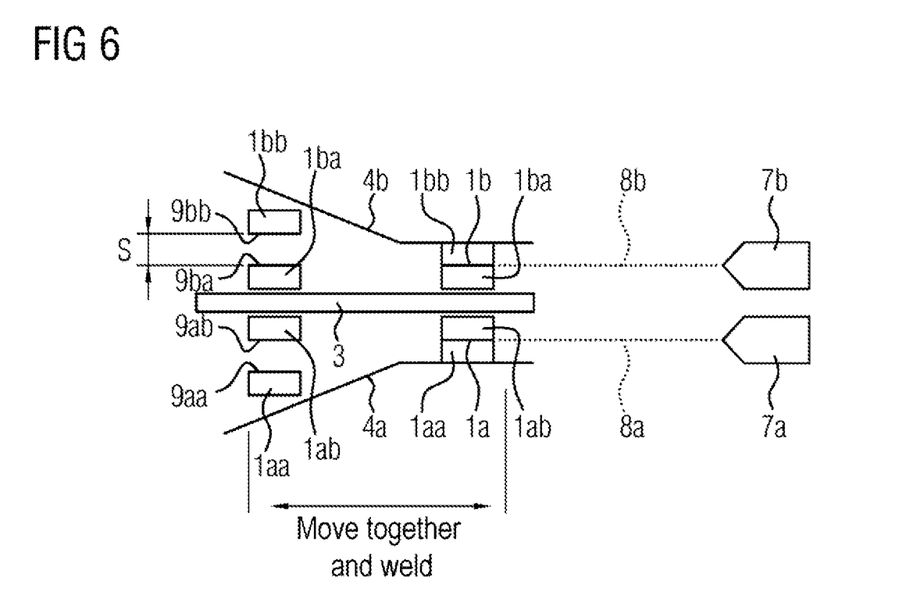
FIG. 6 illustrates a schematic drawing of a welding procedure in the method.

FIG. 6 illustrates a schematic drawing of the welding process as it occurs in the devices illustrated in FIGS. 1-5. The wire segment pairs 1*a* and 1*b* are initially present with a distance S between the wire segments 1*aa*, 1*ab* or 1*ba*, 1*bb* of the corresponding wire segments pairs 1*a*, 1*b*. The wire segment pairs 1*a* and 1*b* are moreover separated from one another by means of the spacer ring 3. The wire segment pairs 1*a* and 1*b* now pass between the elements 4*a* and 4*b* of the contact-pressing unit 4, which are illustrated schematically in this figure with two straight sections but are normally preferably circular in shape. The wire segments 1*aa*, 1*ab*, 1*ba*, 1*bb* are pressed against one another by the contact-pressing unit 4 at their contact regions 9*aa*, 9*ab* or 9*ba*, 9*bb*, as is shown in the right-hand wire segment pairs 1*a* and 1*b*. Laser radiation 8*a*, 8*b* is now directed by the laser welding heads 7*a* and 7*b* at the wire segment pairs 1*a* and 1*b* so that their wire segments 1*aa*, 1*ab*, 1*ba*, 1*bb* are welded to one another under the contact-pressing force of the contact-pressing unit 4.

Figure 7:
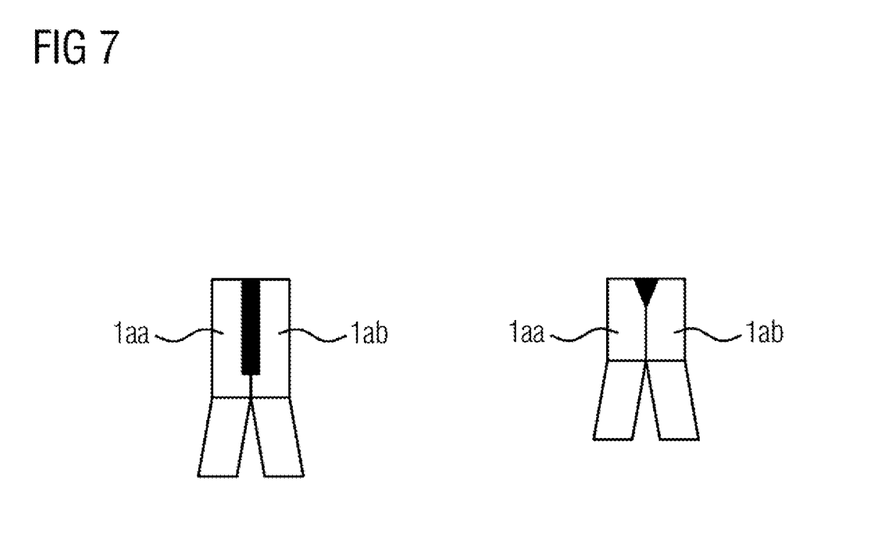
FIG. 7 illustrates exemplary weld seams and FIG. 8 compares the weld seams produced in a conventional manner with weld seams produced by means of a pendulum movement.

Referring to FIG. 7, in some implementations, two weld seams are be produced during the welding process. The left part image, the region that is influenced by the laser beam 8*a*, 8*b* extends with a constant width between the wire segments 1*aa* and 1*ab* as far as a specific depth so that an I-seam is produced. In the case of the fillet weld illustrated in the right part image, the weld region tapers starting from the end face of the wire segments 1*aa* and 1*ab* and extends as far as a specific depth.

Figure 8:
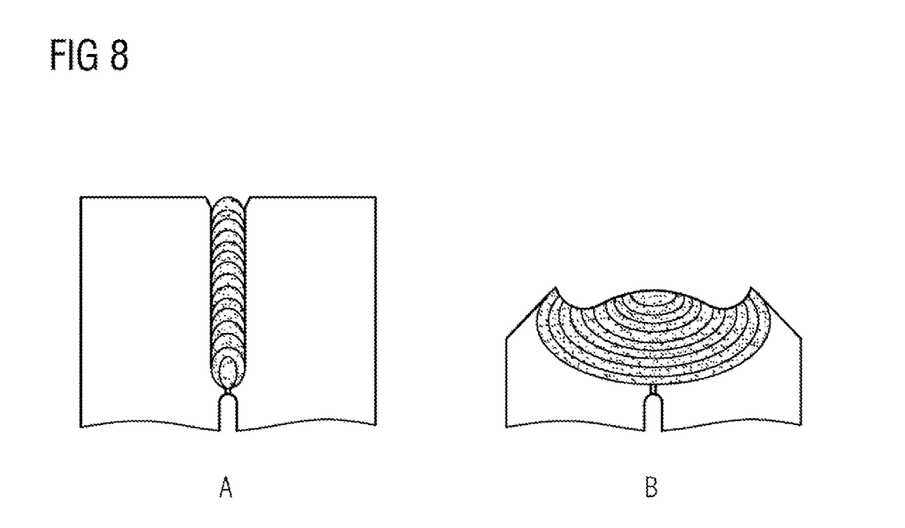

FIG. 8 illustrates in the left part image A a conventional weld seam and in the right part image B a weld seam that has been produced by means of a laser beam that has been guided in an oscillating manner over the end faces of the wire segments that are to be welded. It is possible by virtue of guiding the radiation in an oscillating manner to melt a defined amount of the height of the end face, as a result of which a welding bead with a defined diameter can be produced.

A number of implementations have been described. Nevertheless, it will be understood that various modifications may be made without departing from the spirit and scope of the disclosure. Accordingly, other implementations are within the scope of the following claims.

What is claimed is:

1. A method for welding a plurality of wire segment pairs, each of the wire segment pairs comprises two adjacent-lying wire segments, the respective adjacent-lying wire segments of each wire segment pair have a contact region in which they are to be welded to the respective other wire segment, the method comprising:
    guiding the wire segment pairs one after the other between two elements of a contact-pressing unit, the two elements having a circular shaped periphery, the two elements of the contact-pressing unit have mutually parallel axes of rotation rotating in such a manner that their rate of rotation at their periphery is identical to a speed at which the wire segments of the wire segment pairs that are facing the corresponding element are guided between the two elements;
    at a weld moment at which at least one of the wire segment pairs is located between the two elements of the contact-pressing unit, exerting, by the contact-pressing unit, a contact-pressing force on this wire segment pair so that the wire segments of this wire segment pair can be pressed against one another at their contact regions; and
    at the respective weld moment, directing laser radiation at the one of the wire segment pairs against which the contact-pressing unit is exerting a contact-pressing force at this weld moment, wherein the laser radiation is directed at a region in which the contact regions of the wire segments of the corresponding wire segment pairs are pressed against one another.

2. The method of claim 1, wherein at the weld moments, two wire segment pairs are guided between the two elements of the contact-pressing unit and their contact regions of the wire segments lie on a common force vector of the contact-pressing force at the weld moment.

3. The method of claim 2, wherein the wire segment pairs are arranged along a circle or along a plurality of concentric circles, such that the contact regions of the wire segments of the wire segment pairs lie in each case adjacent to one another in a radial manner with respect to the corresponding circle.

4. The method of claim 3, wherein the wire segment pairs are arranged along two of the concentric circles so that in each case the contact regions of the wire segments of one of the wire segment pairs of one of the circles and the contact regions of the wire segments of one of the wire segment pairs of the other circle lie adjacent to one another in a radial manner with respect to the circles, so that at a respective weld moment the contact-pressing unit simultaneously exerts a contact-pressing force on one of the wire segment pairs of one of the circles and of one of the wire segment pairs of the other circle,
    wherein at the respective weld moment laser radiation is directed at both of the wire segment pairs against which the contact-pressing unit is exerting the contact-pressing force at this weld moment, and
    wherein a spacer ring is preferably arranged between the wire segment pairs of the two circles.

5. The method of claim 2, wherein:
    the laser radiation is directed by a laser beam for each of the wire segment pairs at the two wire segment pairs against which the contact-pressing unit exerts the contact-pressing force at this weld moment; and
    the laser beams are preferably generated in each case by means of a dedicated laser source.

6. The method of claim 2, wherein the contact regions of the wire segments are delimited by an end of the corresponding wire segments and the laser radiation is directed at the corresponding end of the wire segments or at end faces of the wire segments.

7. The method of claim 6, wherein the laser radiation is directed along an oscillating path numerous times one after the other at the end or the end face of the wire segments.

8. The method of claim 1, wherein:
    the two elements of the contact-pressing unit have a tooth-shaped periphery and/or an elastic coating along their periphery and/or have a knurling arrangement along their periphery.

9. The method of claim 1, wherein a minimum spacing between the two elements of the contact-pressing unit is smaller than a sum of extensions of all the wire segments against which the contact-pressing unit simultaneously exerts the contact-pressing force at one of the weld moments in the direction of a contact-pressing force that is exerted by means of the contact-pressing unit.

10. The method of claim 1, wherein one or both of the two elements of the contact-pressing unit are driven and the wire segment pairs pass between the two elements.

11. The method of claim 1, wherein:
    one or both of the two elements of the contact-pressing unit has a toothed periphery; and
    a periodic length of the toothing is equal to a periodic length with which the plurality of wire segment pairs is arranged adjacent to one another.

12. The method of claim 1, wherein:
    the laser radiation has a wave length between 635 nm and 750 nm or 1030 nm; and
    the laser radiation is continuous and/or is generated by means of a disk laser.

13. The method of claim 1, wherein at least one sensor is used to determine a position of the wire segment pairs against which the contact-pressing unit exerts a contact-pressing force and a focal point of the laser radiation is adjusted in such a manner that said focal point has a desired position relative to the corresponding wire segment pair.

14. The method of claim 1, wherein the wire segments are winding rods of a winding of a stator of a three-phase generator.

15. The method of claim 1, wherein the wire segments of each of the wire segment pairs are in each case end regions of wires that are bent in a form of a hair pin.

16. A device for welding a plurality of wire segment pairs having two adjacent-lying wire segments, the respective adjacent-lying wire segments of each wire segment pair have a contact region in which they are to be welded to the respective other weld segment, the device comprises:

a contact-pressing unit including two elements having a circular periphery, the two elements guide the wire segments pairs therebetween one after the other, wherein at a weld moment, at which at least one of the wire segment pairs is located between the two elements of the contact-pressing unit, the contact-pressing unit exerts a contact-pressing force on this wire segment pair so that the wire segments of this wire segment pair are pressed with their contact regions against one another, the two elements of the contact-pressing unit have mutually parallel axes of rotation rotating in such a manner that their rate of rotation at their periphery is identical to a speed at which the wire segments of the wire segment pairs that are facing the corresponding element are guided between the two elements; and at least one laser unit outputting laser radiation at the weld moment, the laser radiation is directed onto one of the wire segment pairs against which the contact-pressing unit exerts the contact-pressing force, the laser radiation is directed onto a region in which the contact regions of the wire segments of the corresponding wire segment pairs are pressed against one another.

17. The device of claim 16, wherein at the weld moments, two wire segment pairs are guided between the two elements of the contact-pressing unit and their contact regions of the wire segments lie on a common force vector of the contact-pressing force at the weld moment.

18. The device of claim 16, wherein the wire segment pairs are arranged along a circle or along a plurality of concentric circles, such that the contact regions of the wire segments of the wire segment pairs lie in each case adjacent to one another in a radial manner with respect to the corresponding circle.

19. The device of claim 18, wherein the wire segment pairs are arranged along two of the concentric circles so that in each case the contact regions of the wire segments of one of the wire segment pairs of one of the circles and the contact regions of the wire segments of one of the wire segment pairs of the other circle lie adjacent to one another in a radial manner with respect to the circles, so that at a respective weld moment the contact-pressing unit simultaneously exerts a contact-pressing force on one of the wire segment pairs of one of the circles and of one of the wire segment pairs of the other circle, wherein at the respective weld moment laser radiation is directed at both of the wire segment pairs against which the contact-pressing unit is exerting the contact-pressing force at this weld moment, and wherein a spacer ring is preferably arranged between the wire segment pairs of the two circles.

20. The device of claim 18, wherein:
the laser radiation is directed by a laser beam for each of the wire segment pairs at the two wire segment pairs against which the contact-pressing unit exerts the contact-pressing force at this weld moment; and
the laser beams are preferably generated in each case by means of a dedicated laser source.

21. The device of claim 18, wherein the contact regions of the wire segments are delimited by an end of the corresponding wire segments and the laser radiation is directed at the corresponding end of the wire segments or at end faces of the wire segments.

22. The device of claim 21, wherein the laser radiation is directed along an oscillating path numerous times one after the other at the end or end face of the wire segments.

23. The device of claim 16, wherein the two elements of the contact-pressing unit have a tooth-shaped periphery and/or an elastic coating along their periphery and/or have a knurling arrangement along their periphery.

24. The device of claim 16, wherein a minimum spacing between the two elements of the contact-pressing unit is smaller than a sum of extensions of all the wire segments against which the contact-pressing unit simultaneously exerts the contact-pressing force at one of the weld moments in the direction of a contact-pressing force that is exerted by means of the contact-pressing unit.

25. The device of claim 16, wherein one or both of the two elements of the contact-pressing unit are driven and the wire segment pairs pass between the elements.

26. The device of claim 16, wherein:
one or both of the elements of the contact-pressing unit has a toothed periphery; and
a periodic length of the toothing is equal to a periodic length with which the plurality of wire segment pairs is arranged adjacent to one another.

27. The device of claim 16, wherein:
the laser radiation has a wave length between 635 nm and 750 nm or 1030 nm; and
the laser radiation is continuous and/or is generated by means of a disk laser.

28. The device of claim 16, wherein at least one sensor is used to determine a position of the wire segment pairs against which the contact-pressing unit exerts a contact-pressing force and a focal point of the laser radiation is adjusted in such a manner that said focal point has a desired position relative to the corresponding wire segment pair.

29. The device of claim 16, wherein the wire segments are winding rods of a winding of a stator of a three-phase generator.

30. The device of claim 16, wherein the wire segments of each of the wire segment pairs are in each case end regions of wires that are bent in a form of a hair pin.

* * * * *